Dec. 8, 1942.  C. A. SNYDER  2,304,744
DUST DISPOSAL UNIT
Filed June 6, 1940  3 Sheets-Sheet 1
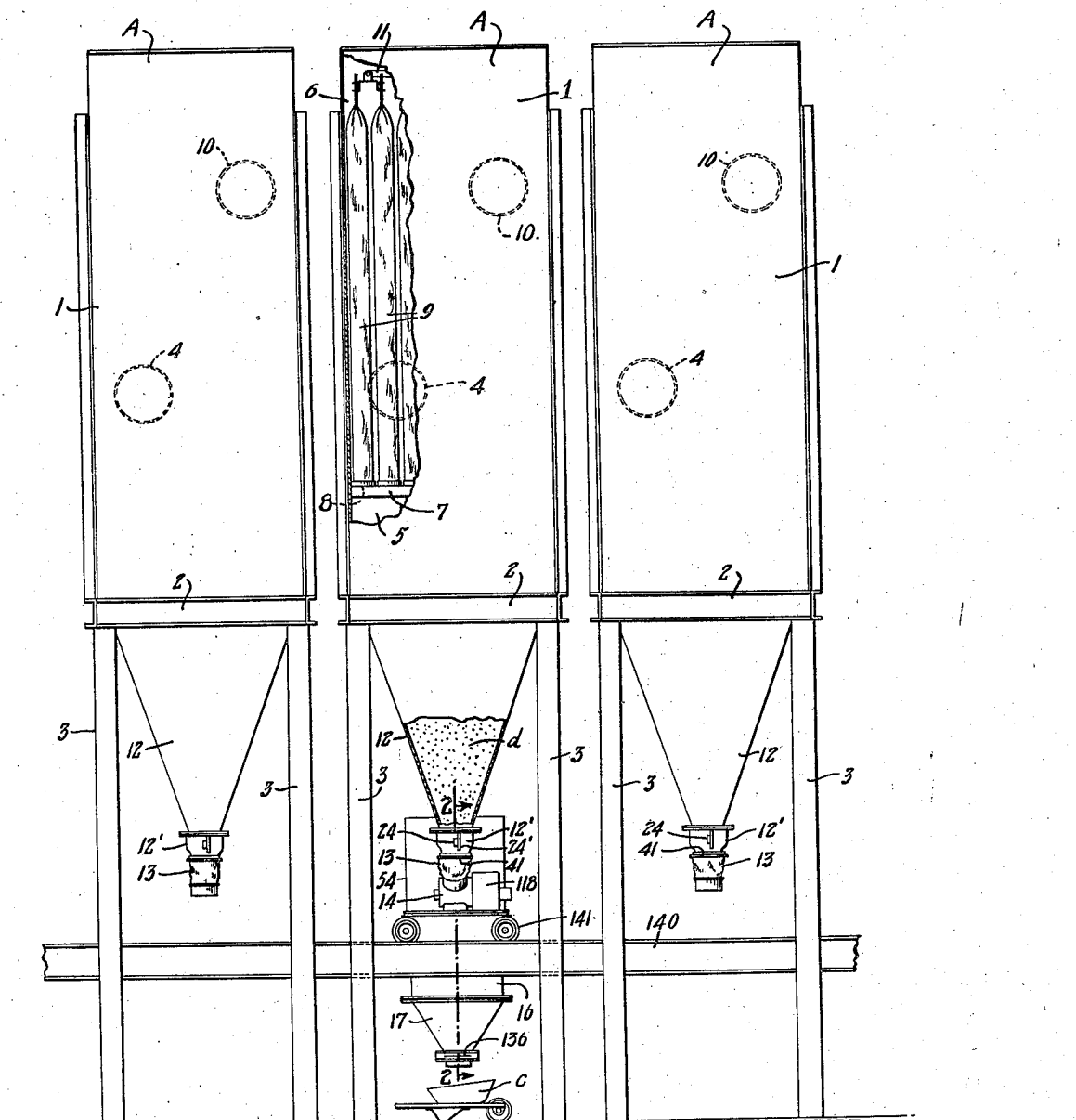
INVENTOR:
CLYDE A. SNYDER,
BY
ATTORNEY Dec. 8, 1942.   C. A. SNYDER   2,304,744
DUST DISPOSAL UNIT
Filed June 6, 1940   3 Sheets-Sheet 2
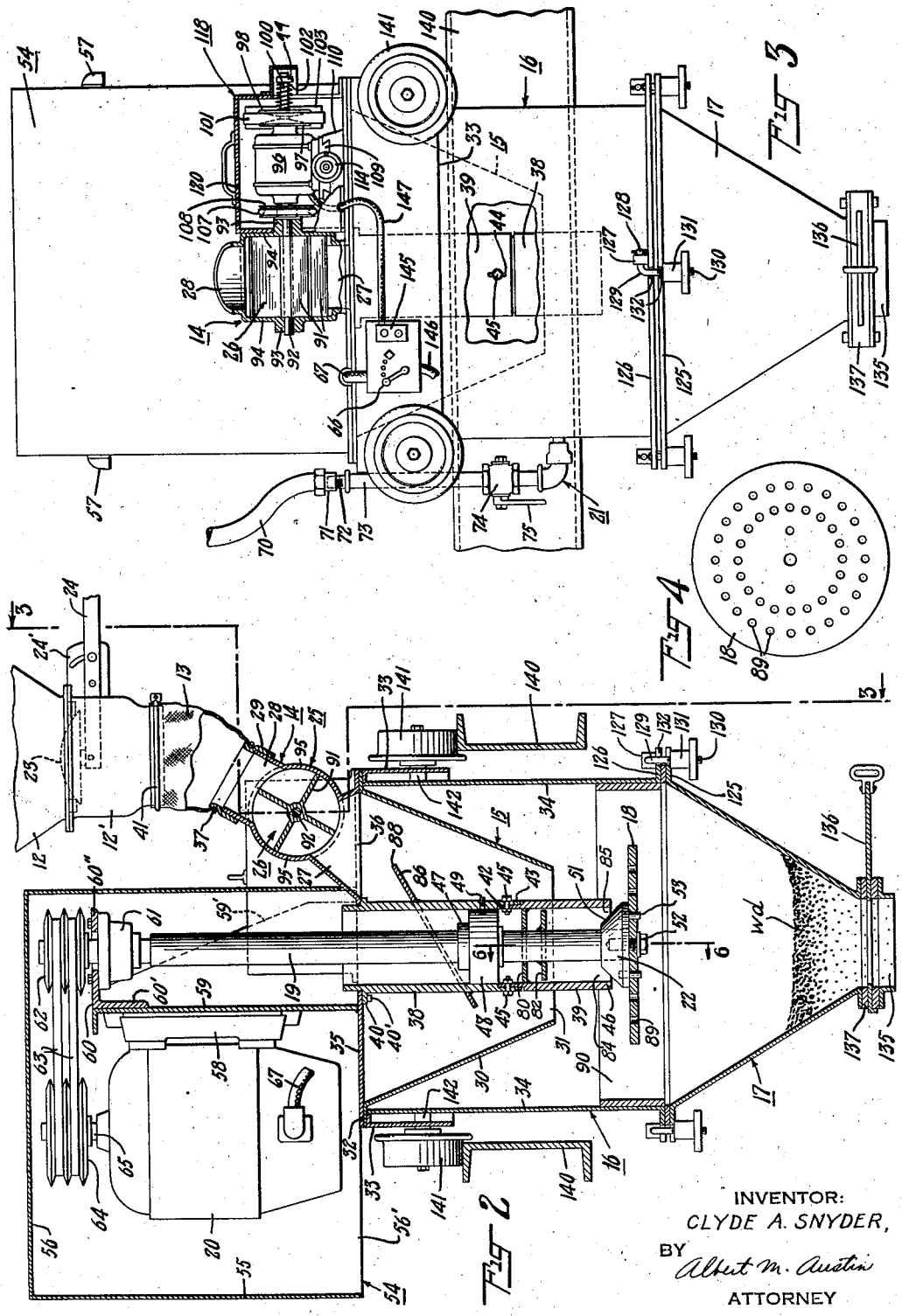
INVENTOR:
CLYDE A. SNYDER,
BY Albert M. Austin
ATTORNEY

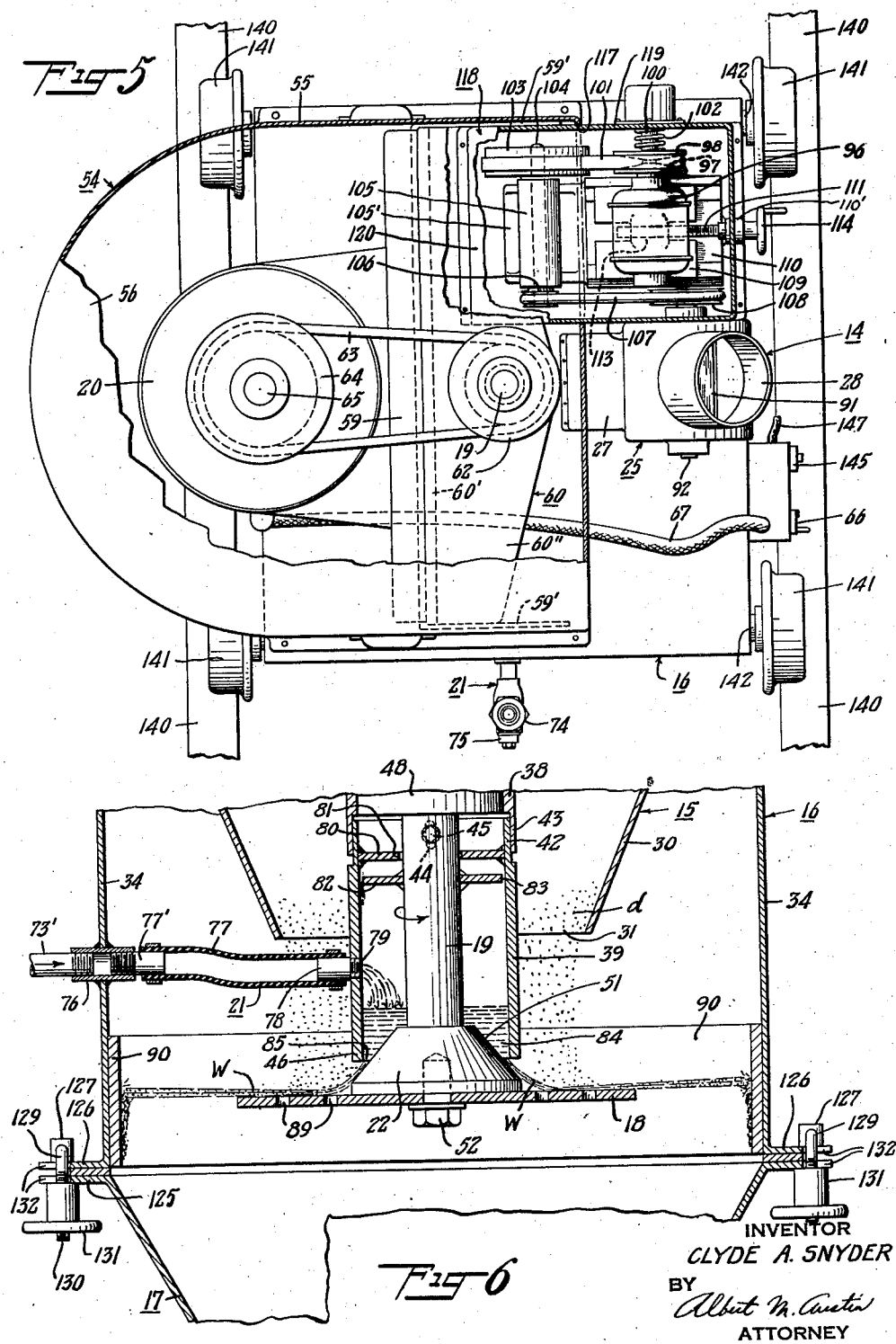

Patented Dec. 8, 1942

2,304,744

UNITED STATES PATENT OFFICE 2,304,744

DUST DISPOSAL UNIT

Clyde A. Snyder, Mishawaka, Ind., assignor to The American Foundry Equipment Company, Mishawaka, Ind., a corporation of Delaware Application June 6, 1940, Serial No. 339,100

13 Claims. (Cl. 183—38)

This invention relates to a dust disposal system, and more particularly to apparatus adapted to be employed in combination with cloth filters or other dry types of dust collectors for wetting and mixing with water or other liquids the collected dry dust discharged from the hoppers of the dry collector.

It is generally recognized in the art that the cloth or filter type of dry dust collector is highly efficient in the removal of dry dust entrained in the air. However, a serious problem is confronted in the removal of such dry dust from the hopper of the collector because of the tendency of some of the dust to be dispersed into the air upon emptying the hopper.

The wet type dust collectors, wherein the dust laden air is saturated with a water spray, have been heretofore used but such wet dust collectors are relatively inefficient in removing dust from the dust saturated air as compared with the efficiency obtained with a cloth filter type dust collector.

An object of this invention is to provide an effective and practical dust disposal unit adapted to be used in combination with the cloth filter type or other dry type of dust collector whereby the dry dust may be saturated and reduced to a non-dispersible sludge or slurry before it is removed to the open air.

Another object of this invention is to provide a wet disposal unit designed for wetting and mixing with water or other liquids the collected dust discharged from the hoppers of the cloth filter type or other dry type of dust collector.

Another object of this invention is to provide a dust collecting and disposal system which combines the high dust collecting efficiency of the cloth filter type dust collector with non-dispersible dust disposal features.

Another object of this invention is to provide a wet dust disposal unit which is highly efficient and practical, which can be associated with dry type dust collectors without requiring change or modification in the dry collector, which can be constructed and operated economically and at low cost, and wherein the amounts of dust and water to produce the desired sludge mixture may be controlled by the operator.

Other objects of this invention will become apparent as the disclosure proceeds.

In accordance with this invention, a dust disposal unit is provided which is designed to be quickly and easily attached to the discharge hopper of a cloth filter type or other dry type of dust collector and which functions and operates to wet and mix with water or other liquids the collected dust discharged from the dry collector.

The wet disposal unit is so designed as to effect a thorough and uniform mixture of the dust and water or other liquids which when discharged is in the form of a sludge or slurry of such a character that it cannot be again picked up, or blown, or dispersed into the air. The unit is provided with a hopper or dust tube chute provided with a receiving conduit which may be detachably connected to the discharge end of the dust collector hopper. A spinner disc is positioned below the discharge end of the dust chute upon which measured quantities of the dry dust may drop. The dust spinner disc rotates in a generally horizontal plane and is connected to a vertical shaft driven by a motor. The spinner shaft rotates within a bearing tube whose lower end is positioned just above the spinner disc and below the discharge end of the dust chute. This bearing tube is formed of two tubular sections adjustably connected end for end so that the lower end of the lower section can be adjustably spaced from the outer cone shaped surface of a liquid deflecting hub attached to rotate with the spinner disc. A liquid supply line leads into the bearing tube at a point above the liquid deflecting hub. The water escapes through the circular opening defined by the lower end of the lower tubular section and the conical surface of the rotating liquid deflecting hub. This hub deflects the liquid onto the upper surface of the spinner disc where it forms in an outwardly moving film or layer. Dry dust drops from the lower end of the dust chute onto the film of liquid which covers the spinner disc and the two materials become mixed into a sludge or slurry as they are centrifugally thrown from the periphery of the disc. The dust chute, bearing tube, spinner shaft and spinner disc are enclosed within a suitable housing. A sludge receiving funnel is detachably secured to the lower end of the housing, this funnel being provided with a sludge discharge port.

In the construction herein provided a single small horsepower motor of one or two horsepower is all that is required to drive the mixing unit and the main moving parts are the spinner disc and liquid deflecting hub which are fixed to a common drive shaft. In operation the dust supply conduit is connected to the discharge port of the dry dust collector hopper. The motor is thrown into operation causing the spinner disc to rotate at a rim speed of approximately 6000 to 8000 feet per minute. The lower tubular section is vertically adjusted to obtain the desired size of liquid discharge opening between the deflector hub and the lower end of the section. The liquid control valve in the liquid supply line is opened and liquid is admitted into the lower tubular section which escapes from the opening at the lower end of the section, is deflected by the hub onto the spinned disc on which it spreads into a film moving rapidly outwardly over the disc. A dust feeding device is provided in the dust supply conduit whereby a measured controlled quantity of dust can be fed onto the film of liquid which covers the spinner disc. The moving water or liquid film and dust become thoroughly but rapidly mixed during its outward movement on the spinner disc, so as to produce a sludge or slurry of such specific gravity that it cannot again become dispersed in the air. The operator can obtain any desired mixture of dry dust and liquid so as to produce a sludge or slurry of the desired consistency by a simple adjustment of the dry dust feed control means or the water control means at the deflecting hub, or both.

This improved dust disposal unit is admirably adapted to be associated with a plurality of dry dust collectors. In such an installation, the unit is provided with rollers movable over a track extending underneath the hoppers of the several dust collectors so that the unit can be moved from one hopper to another as required. A quick coupling device allows rapid connection to the hopper discharge spout.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a side elevational view of a complete dust collecting system including a plurality of dry cloth filter type dust collectors having associated therewith the wet disposal unit supported on a carriage movable on tracks positioned below the hopper of the dust collector, certain parts being broken away to illustrate certain structural details;

Fig. 2 is an enlarged vertical cross-sectional view through the wet disposal unit as it appears when looking in the direction of the arrows 2—2 of Fig. 1;

Fig. 3 is a side elevational view of the wet disposal unit as it appears when looking in the direction of the arrows 3—3 of Fig. 2, certain parts being broken away to illustrate certain structural details;

Fig. 4 is a top plan view of the spinner disc;

Fig. 5 is a top plan view of the wet disposal unit with certain parts broken away to illustrate structural details; and Fig. 6 is an enlarged fragmentary cross-sectional view of the unit as it appears when looking in the direction of the arrows 6—6 of Fig. 2, this view intending to illustrate generally the movement of the liquid and dust when the unit is in operation.

Similar reference characters refer to similar parts throughout the several views of the drawings and specification.

There is shown in Fig. 1 a plurality of cloth filter type dust collectors A with which a single wet disposal unit may be associated. While there are several well known types of dry dust collectors with which my improved wet disposal unit may be associated, Fig. 1 illustrates a well known cloth tube type of dust collector which may be constructed as shown in my previous patent No. 2,143,664, issued January 10, 1939. Such cloth tube or filter type dust collector comprises generally an enclosed cabinet 1 formed of sheet metal resting on a suitable framework 2 supported some distance from the ground or floor surface by supporting legs 3. The dust laden air is drawn into the cabinet 1 through an inlet conduit 4 and the filtered clarified air is ejected through an outlet conduit 10. The interior of the cabinet 1 is divided into a lower dust receiving chamber 5 and an upper dust tube containing chamber 6 by a horizontally extending plate 7. The plate 7 is provided with a plurality of circular holes or apertures 8 each providing an inlet for the dust laden air entering the lower end of a filter bag 9 which surrounds the opening. The bags 9 are formed from heavy cloth or canvas which has a fine mesh or weave so that the dust is fully filtered out of the air as the air passes through the walls of the bag. The bags are suitably suspended from a shaker frame 11 positioned at the upper end of bag chamber 6. Suitable driving mechanism may be provided for agitating the frame 11 so as to shake the bags 9 so that the dust particles clinging to the interior thereof will drop out through the holes 8 in the bag plate 7 and fall into the dust collecting hopper 12 attached to the lower end of the cabinet 1. A suitable suction fan is generally provided for drawing the dust laden air into the filter bags 9 and the filtered air through the walls of the filter bags and into the clarified air discharge conduit 10. It is appreciated that other types of dry dust collectors may be used in combination with the wet disposal unit.

The dry dust d filtered from the air collects in the dust collector hopper 12. A discharge spout 12' is fixed to the lower end of the hopper 12. The discharge spout 12' is provided with a suitable spout closure such as a movable plug valve 23 fixed to the end of a lever 24 rockably mounted on a suitable bracket 24'. Other forms of closure valves may of course be used to retain the collected dust within the hopper 12 when closed and permit removal of the dust from the discharge spout 12' when opened.

The dust which is collected within the hopper 12 comprises particles of foreign matter which are so finely comminuted that they are normally held suspended in the air. It will be appreciated that the dust contained in the hopper 12 must be periodically removed if the dust collectors are to operate properly. The disposal of this dry dust presents a serious problem. Due to its dispersible nature it cannot be dumped into piles or open pits. A slight air movement will cause a swirl of dust to be generated which is deleterious to health and otherwise objectionable. This dry dust is so bulky that it cannot be run into tanks or closed pits as these tanks or pits would soon be filled with the bulky dust. Nor can the dust be emptied into sewers, streams or bodies of water since much of the dust is so light that it would float upon the surface of the water and thus continue to constitute a dust menace.

The wet disposal unit herein described operates to quickly and efficiently saturate the dry dust with water or any selected liquid so as to reduce the material to a non-dispersible sludge or slurry whose total volume is a fraction of that of the loose dust as contained in the dust collector hoppers 12.

The unit generally comprises a dust receiving chute or cone 15 provided with an inlet conduit 14 which may be detachably connected to the lower end of a flexible connecting tube 13 which is attached to the end of the hopper spout 12' by a suitable attaching strap 41. The dust chute 15 as well as other parts of the apparatus is contained within a housing 16 provided with a sludge receiving hopper 17. The dust discharged from the dust chute 15 is deposited upon a high speed mixing disc 18 fixed to the end of a vertically extending shaft 19 driven by a motor 20. Water or other liquid supplied by piping 21 is discharged onto the outer conical surface of a hub member 22 which deflects the water onto the mixing disc 18. The mechanism is so constructed as to cause an instantaneous mixing of the dust and liquid and the sludge thus produced drops into the sludge receiving hopper 17.

The dust receiving chute 15 comprises more particularly a generally conically shaped member having a conically shaped side wall 30 formed of sheet metal, the lower end of which is cut off to provide a dust discharge opening 31. The upper end of the truncated conical side wall 30 terminates in an outturned flange 32 which rests upon a rectangular shaped frame 33 which provides a supporting framework for the unit. The housing 16 comprises generally four enclosing side walls 34 formed from sheet metal the upper ends of which are fixed to and supported by the rectangular framework 33. The top of the housing is closed by a closure plate 35 suitably secured to the framework 33. The top wall 35 is provided with a dust receiving opening or aperture 36 which leads into the dust receiving chute 15. The dust supply conduit 14, which may be formed of sheet metal, is so arranged as to conduct the dust through the receiving opening 36 in the top wall 35 and permit it to fall into the receiving chute 15.

The supply conduit 14 is of special construction and is provided with a body portion 25 which contains a driven dust feeding device 26, a discharge portion 27 and a dust entry portion 28. The flexible connecting spout 13 may be formed of canvas which is provided with a metal collar 29 which telescopes over the entry portion 28 of the supply conduit 14. The lower end of the flexible conduit 13 is secured to the collar 29 by means of a flexible band 37. Thus the flexible conduit 13 carried by the discharge spout 12' of the collector hopper 12 may be quickly connected to supply conduit 14 of the unit merely by telescoping the collar 29 over the entry portion 28 thereof.

A tubular member comprising an upper section 38 and a lower section 39 is positioned within the housing 16 so that their axes are concentric with the axis of the truncated conically shaped side wall 30 of the dust chute 15. The upper tubular section 38 is provided with an outwardly extending flange 40 at its upper end by means of which it may be secured as by bolts 40' to the top wall 35 of the housing. The lower end of the upper tubular section 38 is provided with a sleeve portion 42 which telescopes over and snugly fits around a sleeve portion 43 provided at the upper end of the lower tubular member 39, as clearly shown in Fig. 6. Thus the lower tubular section has a vertically sliding fit with the upper tubular section, for a purpose which will presently be explained. The sleeve portion 42 is provided with a plurality of spaced vertically extending slots 44 through which set screw bolts 45 extend. The threaded ends of the set screw bolts 45 screw into threaded apertures provided in the sleeve portion 43. By manipulating the set screws 45 vertical adjustment of the lower tubular sleeve can be effected and the lower end 46 of this sleeve may be held in any desired fixed position.

The vertical shaft 19 extends up through the concentric tubular sections 38 and 39 with the lower end thereof extending generally below the lower end 46 of the lower tubular section. The shaft 19 is journalled in a suitable bearing 47 fixed to a supporting collar 48 positioned within the upper tubular section 38. The collar 48 is fixed to the upper tubular section 38 by means of suitable set screws 49. Thus it will be appreciated that the shaft 19 is free to rotate within the normally stationary aligned tubular sections 38 and 39, with the lower tubular section 39 free for vertical adjustment.

The lower end of the shaft 19 extends through a concentric opening provided in the liquid deflecting hub 22. It will be noted that this hub has a generally conically shaped outer surface 51. The mixing disc 18 seats against the lower face of the deflecting hub 22 and is secured to the end of the shaft 19 by a threaded securing bolt 52 which extends through a hole in the disc 18 and is threaded into a threaded hole in the end of the shaft 19. The hub 22 is fixed to rotate with the disc 18 by means of a pair of spaced pins 53 which extend into aligned sockets in the upper face of the disc 18 and the lower face of the hub 22.

The upper end of the shaft 19 is contained within a suitable motor housing 54 formed of sheet metal, which comprises enclosing side walls 55 and a top wall 56, which rests upon the top wall 35 of the housing 16. The housing 54 may be lifted off the housing 16 to provide access to the motor 20 by lifting handles 57 attached to the side walls 55. The housing 54 partially overhangs the housing 16 to provide an opening 56' through which air may flow to ventilate the motor 20. The motor 20 is fixed to a suitable bracket 58 which is supported upon a vertical plate 59 which is provided with side flanges 59' (see Fig. 5) secured to the adjacent top wall 35 of the housing 16. A horizontally extending frame member 60 of angular cross-section has its vertical leg 60' secured to the plate 59. An upper shaft bearing 61 through which the shaft 19 extends is suitably fixed to the horizontal leg 60" of the frame member 60. The upper end of the shaft 19 carries a suitable sheave 62 around which the V-belts 63 are trained. These belts 63 are also trained to pass around a sheave 64 fixed to the upwardly projecting shaft 65 of the motor 20. It will be noted that the motor shaft 65 is so arranged as to stand in a vertical position. A suitable motor switch 66 is supported upon one of the vertical walls of the framework 33, which switch is connected to the power cable 67 leading to the motor 20. The motor 20 may be thrown into and out of operation by a proper manipulation of the switch 66.

Water is supplied to the unit by a water supply line 21 which includes an ordinary water supply rubber hose 70 which is provided with a threaded collar 71 which can be screwed onto the threaded nipple 72 of a water supply pipe 73 which forms a permanent part of the unit. The water supply pipe 73 is provided with a water flow control valve 74 having a control handle 75 for controlling the volume of water flowing therethrough. The water supply lead-in pipe 73' is connected to a threaded sleeve 76 which extends through one of the side walls 34 of the housing 16, which in turn is connected to a flexible rubber tubing 77 by a suitable coupling 77'. The flexible tubing 77 is connected as by a coupling 78 to a metal nozzle 79 extending through a suitable hole in the lower tubular section 39. A rubber or metal sealing gasket 80 is secured to the inner surface of the lower tubular section 39 and at a point directly above the nozzle 79, the gasket 80 having a central aperture 81 through which the shaft 19 extends. A rubber or metal sealing gasket 82 positioned directly below the sealing gasket 80 is fixed to the shaft 19 to rotate therewith and is arranged to overlap the gasket 80. The peripheral edge 83 of the gasket 82 extends substantially to the inner surface of the lower tubular section 39. The gaskets or plates 80 and 82 prevent any water discharged into the lower tubular section 39 from entering the bearing 47.

As illustrated in Fig. 6, the lower end of the lower tubular section 39 and the conical surface 51 of the hub 22 define in effect a water retaining pocket 84 which is supplied with water by the nozzle 79 which forms a part of the water supply line 21. The lower end 46 of the lower tubular section 39 and the conical surface 51 of the hub 22 define a generally circular water escape opening 85. It will be appreciated that the size of the opening 85 can be adjusted by vertical manipulation of the lower tubular section 39 which may be held in any desired vertically adjusted position by the set screws 45. The flexible rubber tubing 77 permits free vertical adjustment of the lower tubular section 39. Thus the amount of water flowing over the conical surface 51 of the liquid dispersion hub 22 may be definitely controlled.

The water or liquid flowing from the opening 85 is deflected by the conical surface 51 of the dispersion hub 22 onto the mixing disc 18. The water or liquid $w$ deposited on the mixing disc 18 spreads over the disc in a film or thin layer rapidly impelled outwardly toward the outer periphery of the disc 18. The dry dust $d$ entering the conical dust chute 15 admitted through opening 36 is distributed by a deflector plate 86, as shown in Fig. 2, so that the dry dust will discharge substantially uniformly from the circular discharge end 31 of the chute 15. The deflector plate 86 is secured to the tubular section 38 of the chute 15 in generally downwardly inclined position and is arranged to surround the tubular section 38 with the periphery of the deflector plate generally spaced from the conical wall 30 of the chute 15. The upper end 88 of the deflector plate 86 is so positioned that it will deflect approximately one-half of the dry dust entering the chute 15 through opening 36 to the opposite side of the conical wall 30, so that approximately uniform discharge through the circular opening 31 in the chute 15 is obtained.

The dry dust $d$ discharging from the circular opening 31 in the chute 15 drops down onto the film of water or liquid $w$ spread over the top surface of the mixing disc 18. To insure rapid and thorough mixing of the dust with the water to provide a sludge of the desired consistency, the mixing disc 18 is provided with a considerable number of holes 89 which serve to agitate the water film on the disc 18 and facilitates thorough mixing of the water or liquid and dry dust. The water and dust mixture reduced to sludge $wd$ is hurled at a relatively high velocity from the periphery of the disc 18 and spatters against a protecting plate 90 fixed to the inside face of the enclosing side walls 34 of the housing 16 from which it drops into the sludge receiving hopper 17.

It will also be appreciated that the mixing disc 18 also causes a substantial circulation of finely divided water or water mist and dust so as to further facilitate the mixing thereof within the housing 16. Due to the high speed rotation of the mixing disc 18, the mixing effect of the water and dust is truly enormous even though the mixing disc 18 may be only twelve to twenty-four inches in diameter. With a mixing disc of this size the dry dust in the dust collector hopper 12 can be withdrawn and reduced to sludge substantially as fast as the dust can be withdrawn from the discharge spout 12' of the dust collector hopper if no sludge reducing unit was employed.

It will be appreciated that upon long standing the dust in the collector hoppers 12 may have formed into cohesive lumps which would prevent a uniform flow of loose dust into the dust chute 15. To break up dust lumps and to obtain a metered and uniform delivery of loose dust into the dust chute 15, I have provided a dust feeding device 26 which comprises a plurality of radially extending vanes 91 fixed to a shaft 92 rotatably mounted in bearings 93 provided in the two end walls 94 forming a part of the body portion 25 of the feed conduit 14. The body portion 25 is further provided with two arcuate shaped side walls 95 which are so formed that no dust can escape into the dust chute 15 unless the feeder 26 is rotating. When the feeding device 26 is rotated the vanes 91 thereof serve to break up any dust lumps or packed dust so that the dust is discharged in a finely dispersed stream from the contracted discharge outlet 31 of the dust chute 15.

As shown more particularly in Figs. 3 and 5, the feeding device 26 is driven by a motor 96 operably connected to the shaft 92 of the feeding device 26 by a suitable variable speed reducer, which may be of any well known type. For the purpose of illustration only, there is shown in Figs. 3 and 5 what is known as a "Reeves" speed reducer which comprises in its essentials a split pulley, one conical portion 97 thereof being fixed to the motor shaft 100 and the companion conical portion 98 thereof being slidably but rotatably mounted on the same motor shaft. A driving belt 101 is trained between the conical paired portions 97 and 98, which portions are normally pressed together by a coil spring 102 which surrounds the outer end of the motor shaft 100. One end of the coil spring 102 presses against a nut 99 fixed to the end of motor shaft 100 and the other end presses against the conical half portion 98. The belt 101 is also trained around pulley 103 fixed to a shaft 104 rotatably mounted in stationary bearing 105 supported by bracket 105'. The shaft 104 also carries a small pulley wheel 106 which receives belt 107 trained around pulley 108 fixed to shaft 92 of the feeding device.

When the "Reeves" type of variable speed reducer is used the motor 96 is generally fixed to a slider plate 109 which slides within a stationary base block 110 which may be supported upon the top wall 35 of the housing 16. The threaded shank portion of shaft 111 extends through a threaded sleeve 113 forming a part of the motor slider plate 109. The unthreaded portion of the shaft 111 extends through and rotates in a bearing collar 110' fixed to the stationary block 110. The outer end of shaft 111 is provided with a hand wheel 114 which may be manipulated to slide the plate 109 on which the motor 96 is mounted on the base block 110. Thus when the motor 96 is drawn away from stationary bearing 105, the conical half portions 97 and 98 split apart against the action of the coil spring 102 to permit the belt 101 to slip deeper into the split pulley formed by the half portions 97 and 98 and thus decrease the rotating speed of the vanes 91 of the feeding device. When the motor 96 is moved closer to the stationary bearing 105, the half portions 97 and 98 move closer together under the action of coil spring 102 so as to force the belt 101 nearer to the outer periphery of the half portions 97 and 98, thus increasing the rotating speed of the feeder vanes 91. It will be appreciated that other well known variable speed reducers may be employed whereby the speed of rotation of the feeder vanes 91 may be regulated and controlled.

Since ample room is provided in the motor housing 54 for additional mechanism, a portion of the speed reducing mechanism, as shown in Fig. 5, may be contained therein. One of the side walls 55 of the motor housing 54 has a suitable opening 117 through which a secondary housing 118 which encloses the variable speed reducer and the motor 96 may be inserted. The housing 118 comprises enclosing side walls 119 which are suitably notched or cut away to take care of projecting portions of the machinery. The top of the housing 118 is enclosed by a top wall 120 and the housing 118 can be lifted off by handle 121 attached to the top wall 120. The housings 54 and 118 serve the purpose of protecting the machinery contained therein against damage from dirt and weather and prevent injury to persons who might otherwise come in contact therewith.

The sludge hopper 17 may be removably connected to the lower end of the housing 16 so that access may be had whenever desired into the mechanism contained within the housing 16. The upper end of the sludge hopper 17 is provided with an outwardly flared flange 125 which seats under a finage 126 flaring outwardly from the side walls 34 of the housing. The housing flange 126 is provided with a plurality of spaced lugs 127 having an aperture through which one leg 128 of an L-pin 129 extends. The other leg 130 of the L-pin 129 is threaded and extends downwardly, and receives a threaded cap nut 131. The flanges 125 and 126 are provided with aligned slots 132 to receive the downwardly extending leg 130 of the L-pin 129. The cap nuts 131 may be manipulated to press against the flange 125 of the hopper and firmly secure the hopper to the laterally extending flange 126 of the housing. When cap nuts 131 are loosened they may be swung laterally so as to release them from engagement with the hopper flange 125, permitting the hopper to be removed from the housing.

The lower end of the sludge hopper 17 is provided with a discharge spout 135 which is normally closed by a suitable valve, such as a gate valve 136, which slides within a guide 137 supported by the discharge spout 135. Upon opening the gate valve 136 the sludge may be permitted to drop into a suitable conveyor such as a wheelbarrow c and may then be deposited in a pile or pit without danger that any dust will thereafter become dispersed into the air.

Where the unit is to be used for the disposal of dust from several dust collectors, it is convenient to provide a suitable trackway upon which the unit may be moved under any one of the hoppers of the dust collectors. For example, a pair of spaced tracks 140, either channel shaped or I-shaped in cross-section, may be secured to the supporting uprights 3 of the dust collectors in suitable spaced relationship. The unit is then provided with two pairs of wheels 141 which are adapted to roll upon the tracks 140. The wheels 141 are rotatably mounted upon suitable axles 142 fixed to the frame 33 of the unit. When thus mounted the unit may be wheeled under any one of the discharge hoppers of the dust collectors at intervals as may be required and the collar 29 attached to the flexible conduit 13 of the dust collector to be emptied slipped over the entry portion 28 of the supply spout 14 of the unit.

In operating the disposal unit, the switch 66 is manipulated to throw the motor 20 into operation, causing rapid rotation of the mixing disc 18 and of the water diffusion hub 22. Assuming that the lower tubular section 39 has been first properly adjusted, the water supply valve 74 is opened the desired amount by manipulating the valve handle 75. Water or other desired liquid then flows into the pocket 84, escapes through the circular opening 85 and is distributed in a film on the disc 18. This film flows outwardly at high velocity under the action of centrifugal force effected by the high speed rotation of the disc 18. The dust feeding motor 96 is then thrown into operation by throwing motor switch 145 which makes electrical connection between the main power line 146 and the power cable 147 leading to the motor 96. It will be noted that the main power line 146 is also connected to the switch 66 connected to power cable 67 leading to motor 20. The speed of rotation of the dust feeder vanes 91 is controlled through the variable speed reducer above described by manipulating the control wheel 114. The speed of rotation of the dust feeder vanes 91 is so controlled and regulated as to feed the desired quantity of loose dust into the dust chute 15. The operator can control the desired water and dust mixture either by regulating the speed of rotation of the dust feeder vanes 91 or the quantity of water permitted to pass through the water discharge opening 85. Usually when the proper portions of dust and water have been determined to produce a sludge of the proper consistency, the speed of rotation of the feeder vanes 91, the setting of the water control valve 74, and the lower tubular section 39, need not be further set or disturbed. A water dust mixture and a sludge of any desired consistency may thus be obtained.

The wet disposal unit herein illustrated and described effectively solves the problem of disposing of dry dust from otherwise highly efficient dry dust collectors. The disposal unit is a self-contained machine which may be permanently or detachably connected to the hopper of any dry dust collector. A single disposal unit will take care of the dry dust from almost any desired number of dry dust collectors by mounting the unit on a suitable carriage movable under the hoppers of the dust collectors. A thorough and uniform mixing of the water and dust will be effected whereby a sludge of any desired consistency can be obtained. The water line may be detachably connected to the unit so that no water is in the unit when not in use. The unit itself is of simple construction, requires little power to operate, and all parts are easily accessible for inspection and replacement. The unit will handle dust approximately as fast as the hopper can be unloaded when the dust is dry so that substantially no time is lost in unloading.

While certain novel features of the invention have been disclosed and are pointed out in the annexed claims, it will be understood that various omissions, substitutions and changes may be made by those skilled in the art without departing from the spirit of the invention.

What is claimed is:

1. A sludge producing unit including, a dust chute of generally inverted truncated conical form, a conduit for supplying dust to the upper enlarged end of said dust chute, a dust feeding device positioned within said conduit for controlling the quantity of dust admitted into said chute, a perforated spinner disc positioned to receive dust discharging from the lower contracted end of said conical chute mounted to rotate in a generally horizontal plane, means positioned adjacent the axis of rotation of said disc for dispersing water thereon, means for supplying water to said dispersing means, and means for rotating said disc to effect a sludge mixture of said water and dust.

2. A sludge producing unit including, a dust feeding chute of generally inverted truncated conical form, a conduit for supplying dust to the upper enlarged end of said dust feeding chute, a rotatably mounted device having a plurality of radially extending vanes positioned within said conduit for controlling the quantity of dust admitted into said chute, a spinner plate positioned to receive dust discharging from the lower contracted end of said conical chute arranged to rotate in a generally horizontal plane, means positioned adjacent the axis of rotation of said plate for directing a stream of water thereon, means for supplying water to said directing means, and means for rotating said plate to effect a sludge mixture of said water and dust.

3. A sludge producing unit including, a dust feeding chute of generally inverted truncated conical form, a conduit for supplying dust to the upper enlarged end of said dust feeding chute, a rotatably mounted dust metering device positioned within said conduit, means for rotating said device at variable speeds to control the quantity of dust admitted into said chute, a perforated spinner plate positioned to receive dust discharging from the lower contracted end of said conical chute arranged to rotate in a generally horizontal plane, means positioned adjacent the axis of rotation of said plate for controlling the volume of water discharged onto said plate, means for supplying water to said control means, and means for rotating said plate to effect a sludge mixture of the water and dust deposited on said plate.

4. A sludge producing unit adapted to be associated with a dry dust collector having a dry dust-receiving hopper, said unit including, a perforated spinner plate adapted to rotate about a generally vertical axis, a downwardly tapered dust chute having its lower reduced discharge end positioned to deposit dust on said spinner plate, means for connecting the upper end of said dust chute to the dust collector hopper, a driven shaft fixed to said spinner plate, a normally stationary tubular member surrounding a portion of said shaft, a water diffusion member positioned adjacent the lower end of said tubular member operable to direct a stream of water onto said plate, means for supplying water to said tubular member, means for controlling the volume of water supplied to said diffusion member, and means for rotating said spinner disc whereby the water deposited on said spinner disc becomes mixed with the dust discharged from said dust chute.

5. A sludge producing unit including, an enclosed housing, a spinner plate in said housing adapted to rotate about a generally vertical axis, a downwardly tapered dust chute in said housing having its lower reduced discharge end positioned to deposit dust on said spinner plate, a driven shaft fixed to said spinner plate, a normally stationary tubular member surrounding a portion of said shaft, said tubular member comprising an upper section fixed to said housing and a lower section adjustably secured to said fixed section, a water diffusion hub positioned adjacent the lower end of said lower tubular section and fixed to said shaft, said hub being operable to direct a substantially uniform stream of water onto said spinner plate, piping for supplying water to said tubular member, and means for controlling the quantity of dust discharged from said dust chute onto said spinner plate.

6. A sludge producing unit adapted to be associated with a plurality of dry dust collectors each having a dry dust receiving hopper, said unit including, an enclosed housing, rollers supporting said housing movable along a trackway extending under the hoppers of said dust collectors, a spinner plate in said housing, a dust chute in said housing having its discharge end positioned to direct a stream of dry dust toward said spinner plate, a water dispersion element for directing a distributed stream of water onto said spinner plate, a normally stationary tubular member having its lower end telescoping over said dispersion element to define a water discharge opening therebetween, a rotatable shaft extending through said tubular member connected to said spinner plate, and driving means operably connected to said shaft at a point exterior to said housing for rotating said spinner plate whereby said spinner plate operates to effect a thorough mixing of the dispersed water and dust falling from the discharge end of said dust chute, and means for detachably connecting said chute to the hopper of any one of such dust collectors to be emptied.

7. A sludge producing unit adapted to be associated with a dry dust collector having a dust-receiving hopper, said unit including, an enclosed housing, a spinner plate in said housing, a downwardly tapered dust chute in said housing having its lower reduced discharge end positioned to direct a stream of dry dust onto said spinner plate, means for connecting said chute to the dust collector hopper, a water dispersion element fixed to said spinner plate, a normally stationary tubular member in said chute having its lower end partially surrounding said water dispersion element, means for vertically adjusting said tubular member to vary the water discharge opening defined by the lower end of said tubular member and said dispersion element, means for rotating said spinner plate whereby said spinner plate operates to effect a thorough mixing of the dispersed water dust deposited thereon, said rotating means including a shaft extending into said tubular member with the lower end thereof fixed to said spinner plate, a driving motor exterior to said housing operatively connected to said shaft, and a hopper for receiving the water dust mixture thus produced.

8. A sludge producing unit adapted to be associated with a plurality of dry dust collectors each having a dry dust-receiving hopper, said unit including, an enclosed housing, rollers supporting said housing and movable along a trackway extending along the hoppers of said dust collectors, a spinner plate in said housing arranged in a generally horizontal plane, a drive shaft having its lower end extending into said housing and fixed to said spinner plate, driving means exterior to said housing operatively connected to the upper end of said shaft to rotate the same, a dust chute of inverted truncated conical form in said housing having its lower reduced discharge end positioned to direct a stream of dry dust onto such spinner plate, an element having a generally conical water dispersing surface centrally secured to said spinner plate, a vertically adjustable tubular member in said chute having its lower end partially surrounding the conical surface of said element to define a variable water discharge opening therebetween, means for supplying water to said tubular member, and means for detachably connecting said chute to the hopper of any one of said dust collectors to be emptied.

9. A sludge producing unit, said unit designed for association with a dry dust collector having a dust receiving hopper including an enclosed housing, a dust chute of inverted truncated conical form positioned within said housing, a normally stationary tubular member positioned within said dust chute having its lower end extending below the lower reduced discharge end of said chute, a shaft rotatably mounted in said tubular member, a mixing disc fixed to the lower end of said shaft arranged to rotate in a generally horizontal plane and to receive the dust ejected from the reduced end of said dust chute, a water dispersion element positioned adjacent the lower end of said tubular member and fixed to be rotated by said shaft, means for supplying water to said tubular member, a dust supply conduit, a dust feeding device in said conduit operable to control the quantity of dust passing into said chute, and means for connecting said supply conduit to said dust receiving hopper.

10. A sludge producing unit adapted for association with a dry dust collector having a dust receiving hopper, said unit including an enclosed housing, a dust chute of inverted truncated conical form positioned within said housing, a dust conduit leading to said chute, means for detachably connecting said conduit to the dust receiving hopper, a normally stationary tubular member positioned within said dust chute and having its lower end extending below the lower reduced discharge end of said chute, a shaft rotatably mounted in said tubular member, a sludge producing disc fixed to the lower end of said shaft arranged to rotate in a generally horizontal plane and to receive the dust ejected from the reduced end of said chute, a water dispersion member of generally conical shape positioned adjacent the lower end of said tubular member and fixed to be rotated by said shaft, means for supplying water to said dispersion member, a rotatably mounted dust feeding device in said conduit operable to control the quantity of dust passing into said chute, means for driving said feeding device at variable speeds, and means for controlling the volume of water projected over said sludge producing disc by said dispersion member.

11. A sludge producing unit designed for association with a dry dust collector having a dust receiving hopper, said unit including, a housing, a dust chute of inverted truncated conical form in said housing, a normally stationary tubular member positioned within said dust chute having its lower reduced end extending below the discharge end of said chute, a shaft rotatably mounted in said tubular member, a mixing disc fixed to the lower end of said shaft arranged to rotate in a generally horizontal plane and to receive the dust ejected from the reduced end of said chute, a water dispersion member fixed to be rotated by said shaft and positioned adjacent the lower end of said tubular member and defining a water discharge opening therebetween, means for supplying water to said tubular member, a rotatably mounted dust feeding device operable to control the quantity of dust passing through said chute and onto said mixing disc, means for driving said feeding device at variable speeds, and means for controlling the water volume projected onto said mixing disc.

12. A sludge-producing unit adapted for association with a dry dust collector having a dry dust-receiving hopper, said unit including a perforated spinner disc mounted for rotation in a substantially horizontal plane, a dust chute having a discharge end positioned to direct a stream of dust onto said spinner disc, means for detachably connecting the upper end of said chute to the dust collector hopper, means for projecting a stream of water onto said spinner disc, and means for rotating said spinner disc whereby the water deposited on said spinner disc becomes mixed with the dust discharged from said chute.

13. A sludge producing unit adapted to be associated with a plurality of dry dust collectors each having a dry dust receiving hopper, said unit including an enclosing housing, rollers supporting said housing and movable along a trackway extending under the hoppers of said dust collectors, a spinner plate positioned within said housing adapted to rotate about a generally vertical axis, a dust chute having its discharge end positioned above said spinner plate, a driven shaft fixed to said spinner plate, a normally stationary tubular member surrounding a portion of said shaft, a water diffusion member positioned adjacent the lower end of said tubular member and fixed to said shaft, means for detachably connecting said chute to the hopper of any one of such dust collectors to be emptied, and means for supplying water to said tubular member.

CLYDE A. SNYDER.